July 8, 1924.
G. A. BERNACHE
TRUCK SCALE
Filed Nov. 2, 1922
1,500,541
2 Sheets-Sheet 1
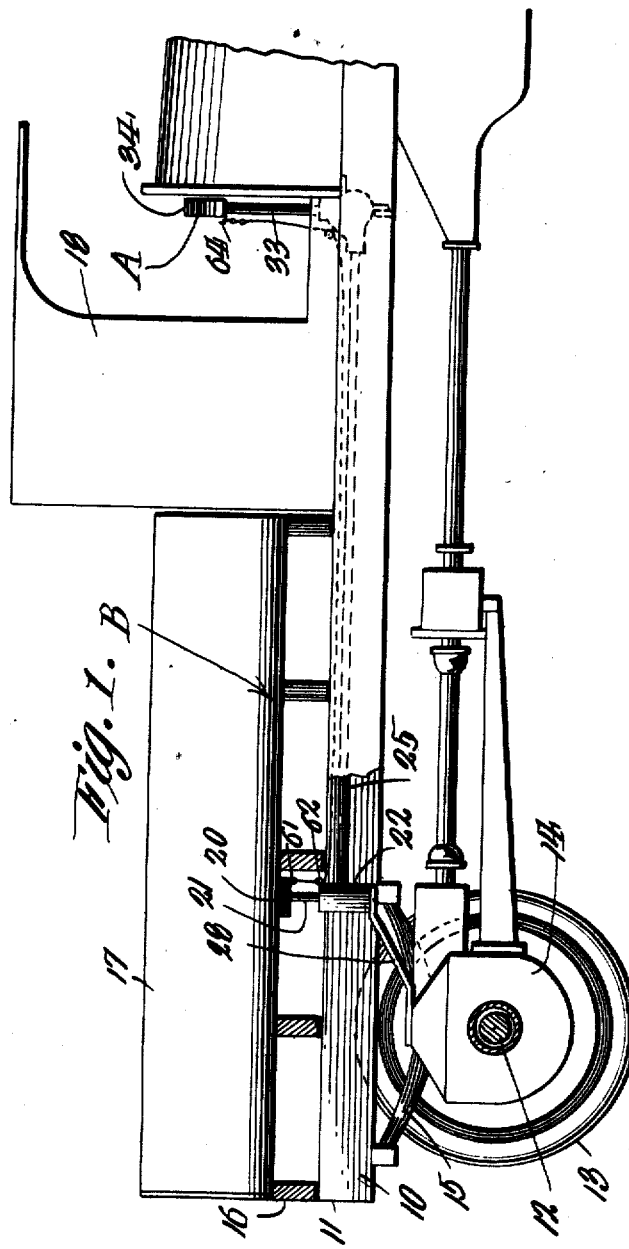
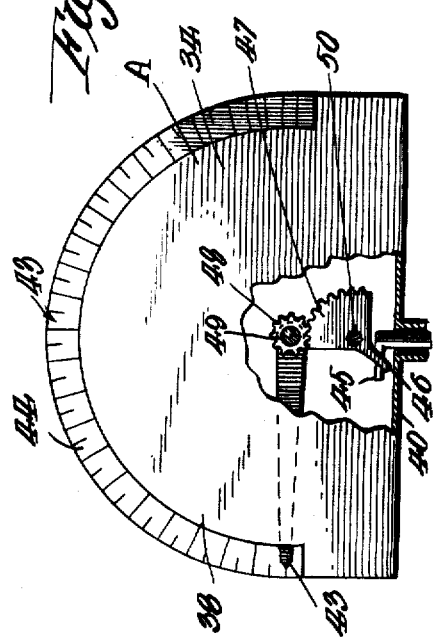
WITNESSES
Guy M Spring
George W Wright
Inventor
GEORGE A. BERNACHE
By Richard B. Owen
Attorney

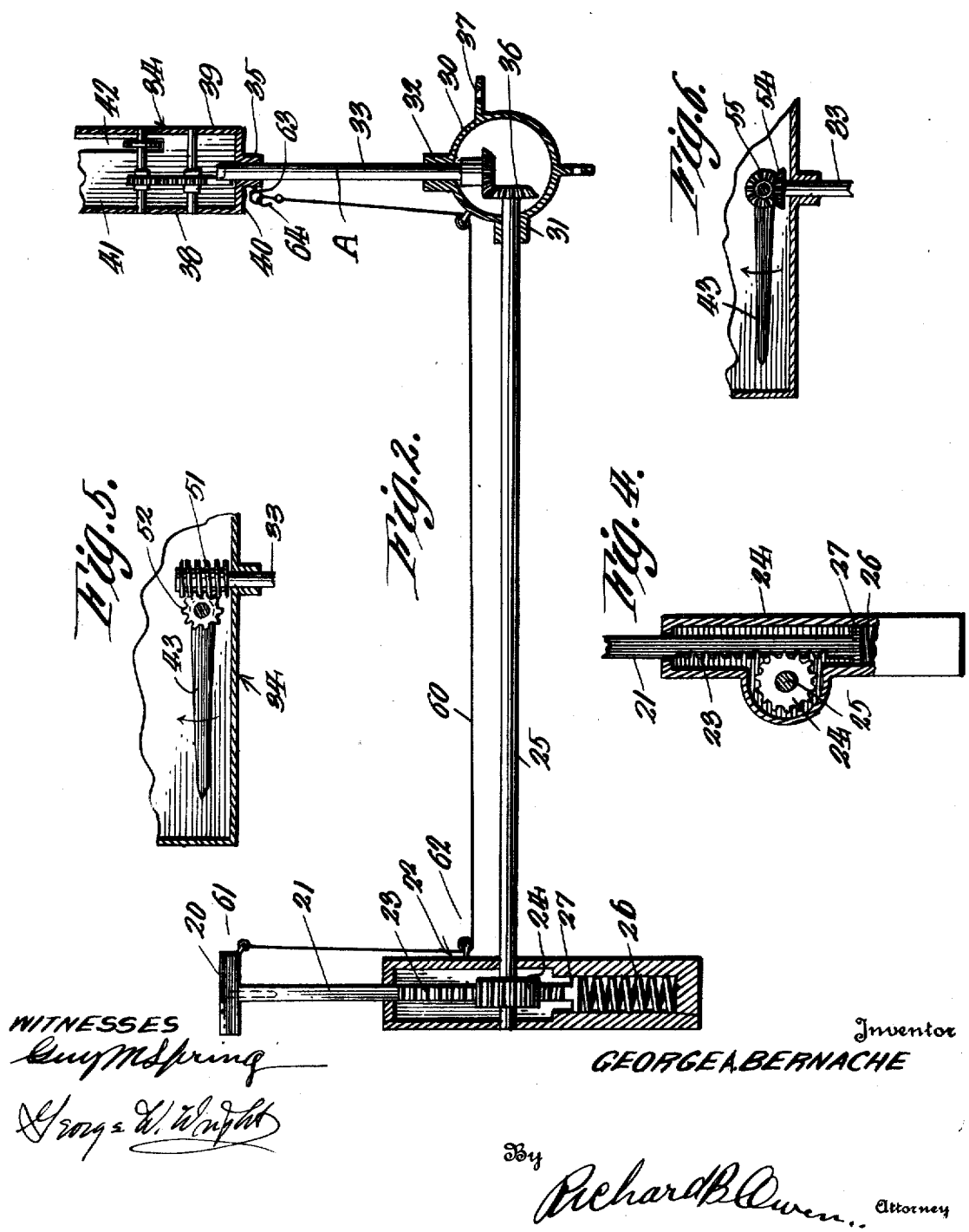

Patented July 8, 1924.

1,500,541

UNITED STATES PATENT OFFICE.

GEORGE A. BERNACHE, OF NORTHAMPTON, MASSACHUSETTS.

TRUCK SCALE.

Application filed November 2, 1922. Serial No. 598,590.

*To all whom it may concern:*

Be it known that I, GEORGE A. BERNACHE, a citizen of the United States, residing at Northampton, in the county of Hampshire and State of Massachusetts, have invented certain new and useful Improvements in a Truck Scale, of which the following is a specification.

This invention relates to attachments for motor vehicles and the primary object of the invention is to provide novel means associated directly with an automobile truck for accurately determining the amount of load carried by the truck body.

Another object of the invention is to provide means incorporated with an automobile truck for permitting the weighing of articles placed on the truck body, thereby effectively eliminating the necessity of weighing the articles prior to the loading thereof on the truck.

A further object of the invention is to provide a novel weighing device associated with automobile trucks embodying a plunger or platform for engaging the body of the truck and novel indicating means associated with the plunger or platform and disposed in the cab of the truck for showing the amount of weight of the load on the truck body.

A further object of the invention is to provide novel means for associating the platform with the chassis of the truck, whereby the said plunger or platform will be free to move with the body of the truck to effectively show the weight of the load carried thereby.

A further object of the invention is to provide novel means for permitting the moving of the plunger or platform from out of engagement with the body, when the vehicle is in motion, thereby effectively preventing injury to the weighing mechanism.

A still further object of the invention is to provide an improved weighing device for motor vehicle trucks of the above character, which will be durable and efficient in use, one will be simple and easy to manufacture, and one which can be placed upon the market and associated with a motor vehicle truck at a minimum cost.

With these and other objects in view the invention consists in the novel construction, arrangement and formation of parts, as will be hereinafter more specifically described, claimed, and illustrated in the accompanying drawings forming a part of the specification, in which drawings:

Figure 1 is a fragmentary side elevation of an automobile truck showing the improved weighing mechanism incorporated therewith, parts of the truck being shown in section to permit the weighing mechanism to be clearly seen.

Figure 2 is a vertical longitudinal section through the improved weighing mechanism prior to the connection thereof with the truck.

Figure 3 is a fragmentary front elevation of the indicating portion of the weighing mechanism, parts thereof being broken away and in section to illustrate the operating parts thereof.

Figure is a vertical fragmentary section through the plunger or platform portion of the weighing mechanism taken at right angles to Figure 2.

Figure 5 is an enlarged fragmentary vertical sectional view illustrating a modified means for connecting the actuating shaft with the indicating pointer.

Figure 6 is a still further modified means for connecting the actuating shaft with the indicator or pointer.

Referring to the drawings in detail, wherein similar characters designate corresponding parts throughout the several views the letter A generally indicates the improved weighing mechanism and B a motor truck with which the same is associated.

While I have shown the improved weighing mechanism associated with a truck, it is to be understood that the same can be applied to other forms and types of motor vehicles. The truck B is of the ordinary or any preferred construction and includes the chassis 10 having the usual side channel beams 11, the rear drive axle 12, the rear drive wheels 13, the housing 14 for the rear drive axle and transmission therefor, and the elliptical springs 15 for connecting the housing 14 with the side channel beams 11. The side channel beams 11 support transverse sills or bars 16 on which the body 17 may rest. This body can be of any preferred type or character. Forwardly of the body 17 the channel beams 11 has secured thereto any preferred type of cab 18.

The improved weighing mechanism A includes a plunger or platform 20, which is disposed intermediate the side channel beams 11 of the chassis 10 and this platform or plunger is adapted to normally engage the lower surface of the body 17. This plunger or platform 20, is in the nature of a flat plate and has secured to its lower surface a depending bar 21, which is slidably mounted within a suitable casing 22. The portion of the bar 21 which is disposed in the casing 22, has rack teeth 23 formed thereon and these teeth are adapted to mesh with a pinion 24 carried by a longitudinally extending operating shaft 25. This shaft 25 is also disposed between the side channel beams 11 and extends forwardly of the body 17 toward the cab 18. The casing 22 is provided with suitable bearing openings for the reception of said operating shaft. A heavy expansion coil spring 26 is disposed within the casing 22 and engages the lower end of the bar 21, which can be provided with a foot 27 for resting upon the upper surface of said spring. It is obvious that the function of this spring is to normally hold the plunger or platform 20 into firm contact with the body 17.

While I have shown rack and pinion connection between bar 21 and the shaft 25, it is to be understood that mechanical equivalents can be substituted therefor if so desired.

The casing 22 is secured in place in any preferred manner, and as shown an arm 28 preferred of strap iron is secured to the transmission casing 14 and supports the lower end of the said casing 22. The forward end of the shaft 25 extends into a suitable gear casing 30 which is provided with right angularly extending bearings 31 and 32. The bearing 31 is in longitudinal alignment with the bearing openings for the rear end of the shaft 25 as can be readily seen by referring to Figure 2 of the drawings. The bearing 32 rotatably supports a countershaft 33 and the upper end of the countershaft is extended into a suitable housing 34 which forms the indicating portion of the weighing mechanism, and will be hereinafter more fully described. This casing 34 however supports a bearing 35 for the upper end of the shaft 33. The counter-shaft 33 and the drive shaft 25 can be connected together in any preferred manner such as by beveled gearing 36, as clearly shown in the drawings. The casing 30 is provided with right angularly extending apertured ears 37 for permitting the same to be connected to a convenient portion of the vehicle chassis. The casing 34 includes front and rear walls 38 and 39 which are of a substantial semicircular shape, a flat bottom wall 40 and an arcuate side wall 41. The arcuate side wall 41 is provided with a longitudinally extending slot 42 through which the indicating pointer 43 is adapted to protrude. The rear wall 39 can be provided with an arcuate extension 43 which is graduated as at 44. It is obvious that these graduations can be of any preferred character for indicating the amount of load carried by the body 17.

It is obvious that a number of different mechanisms can be employed for transmitting the motion of the shaft 33 to the pointer 43 and as shown in Figures 2 and 3, the upper end of the shaft 33 is provided with an operating crank 45, which is disposed in the path of an operating arm 46 formed on a sector rack 47 which meshes with a pinion 48, keyed or otherwise secured to the shaft 49 for the indicator 43. The sector gear 47 is also keyed or otherwise secured to a suitable shaft 50. The shafts 49 and 50 are journalled in the front and rear walls 38 and 39 of the casing 34 as can be clearly seen by referring to Figure 2 of the drawings.

In use the improved device, the platform or plunger 20 will be depressed when a load is placed on the body 17 and the downward movement of this platform or plunger will rotate the shaft 25, which in turn will rotate the shaft 33 and thus swing the pointer or indicator 43 over the dial or graduations 44. This will show the driver of the vehicle the load carried by the body.

While the casing 34 can be placed at any preferred point on a motor vehicle, it is desired to place the same in the cab 18 or adjacent thereto so that the driver of the vehicle can readily see the scale or graduations 44 and the pointer 43 at all times.

In Figure 5 of the drawings I have shown another form of means for connecting the indicator 43 with the shaft 33. This means includes a worm 51 which is keyed to the upper end of the shaft 33 and this worm meshes with a worm wheel 52 carried by the shaft on which the indicator is secured. It can be seen that upon rotation of the shaft 33 that movement will be imparted to the indicator 43 through the worm and worm wheel mechanism.

In Figure 6 of the drawings is shown a still further modified means for connecting the indicator 43 with the shaft 33, and as shown the upper end of the shaft 33 is provided with a beveled gear 54 which meshes with a companion beveled gear 55, which is secured in any preferred manner to the shaft on which the indicator is secured.

The improved weighing mechanism A is only adapted to be used during the loading of the vehicle and when the vehicle is in motion it is desirable to have the platform or plunger 20 out of engagement with the body 17, so that injury to the weighing mechanism will be prevented due to movement of the body 17, the chassis 10 and transmission casing, and as shown a cable 60 is provided for permitting the manual moving of the plunger below the truck body. The upper end of this cable 60 is secured as at 61 to the platform or plunger 20 and this cable is brought forward through suitable guide eyes or pulleys 62 to the housing 34. By pulling up on the forward end of the cable 60, it can be seen that the plunger or platform 20 will be moved down and away from the body 17 against the tension of the coil spring 26. Any suitable means may be provided for holding the cable in its adjusted position so that the platform or plunger 20 will be held below the platform. As shown the forward or upper end of the cable is provided with a hook 63 which is adapted to engage in a suitable eye or the like 64.

From the foregoing description it can be seen that an improved and simple form of weighing mechanism has been provided for motor vehicle trucks which will effectively weigh articles placed on the body.

Changes in details may be made without departing from the spirit or the scope of this invention.

Having thus described my invention what I claim as new is:—

1. The combination with a motor vehicle chassis and a body secured thereto having a driver's cab, of a weighing mechanism associated with said chassis including an indicating portion mounted in the cab comprising a housing provided with a scale and an indicator movable over the scale, a shaft rotatable in the housing for supporting the indicator, a platform, means associating the chassis with the platform, said platform being arranged to engage the lower surface of the body and adapted to be depressed by the body when the same is under load, a shaft extending longitudinally of the chassis, means connecting the platform and shaft for imparting movement to the shaft when the platform is depressed, a counter-shaft, means for imparting the movement of the longitudinal shaft to the counter-shaft, and means for operatively connecting the counter-shaft with the shaft supporting said indicator.

2. The combination with a motor vehicle chassis including a pair of longitudinally extending side beams, a drive axle and casing therefor, resilient means connecting the casing with the side beams and a body connected with the side beams, of a weighing mechanism including an indicating portion having a dial and an indicator movable over the dial, a second casing disposed between the channel beams an arm rigidly connecting the second casing with the axle casing, a platform, a rod secured to the platform and slidably mounted in the second-named casing, an expansion coil spring disposed within the casing and engaging said rod for normally holding the platform in engagement with said body, and means operatively connecting the platform with the pointer for imparting movement to the pointer when the platform is depressed.

3. The combination with a motor vehicle chassis including side channel beams and a drive axle, a housing for the drive axle, leaf springs connecting the housing with the side channel beams and a body connected with said side channel beams including a driver's cab, of a weighing mechanism including an indicating portion mounted in the driver's cab having a graduated dial and a pointer movable over the dial, a casing, an arm rigidly connecting the casing with the housing for the drive axle, a platform means slidably associating the platform with the casing, resilient means normally urging the platform into intimate contact with the body, means operatively connecting the platform with the pointer, and manually operable means for moving and holding the platform out of engagement with the body against the tension of said resilient means.

4. The combination with a motor vehicle chassis including a pair of side channel beams, a drive axle, a housing for the drive axle, elliptical springs connecting the housing with the side channel beams, and a body and driver's cab connected with the side channel beams, of a weighing mechanism including a dial, a pointer movable over the dial, the dial and pointer being disposed adjacent to the driver's cab, a casing, an arm rigidly connecting the casing with the housing for the drive axle, a slidable platform associated with the casing, resilient means disposed in the casing and normally holding the platform in engagement with the body, means operatively connecting the platform with the indicator, and an operating cable secured to the lower surface of the platform and terminating adjacent to the dial and pointer for permitting the lowering of the platform by the driver, out of engagement with the body and means for securing the forward end of the cable against movement.

In testimony whereof I affix my signature in presence of a witness.

GEORGE A. BERNACHE.

Witness:
DOMENICO LASTUMBO.